(12) United States Patent
Beekmans et al.

(10) Patent No.: US 7,124,298 B2
(45) Date of Patent: Oct. 17, 2006

(54) METHOD AND DEVICE FOR DETECTING A WATERMARK

(75) Inventors: Jan Johannes Petrus Maria Beekmans, Eindhoven (NL); Frits Anthony Steenhof, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 833 days.

(21) Appl. No.: 10/167,180

(22) Filed: Jun. 11, 2002

(65) Prior Publication Data

US 2003/0002672 A1 Jan. 2, 2003

(30) Foreign Application Priority Data

Jun. 13, 2001 (EP) .................................. 01202293

(51) Int. Cl.
*G06F 1/26* (2006.01)
(52) U.S. Cl. ...................... 713/176; 713/179; 713/182
(58) Field of Classification Search ................ 713/176, 713/179, 182, 200, 201
See application file for complete search history.

(56) References Cited

U.S. PATENT DOCUMENTS 5,724,277 A * 3/1998 Nakagawa ................. 708/320
5,889,868 A * 3/1999 Moskowitz et al. ........ 713/176
6,064,764 A * 5/2000 Bhaskaran et al. ......... 382/183
6,330,672 B1 * 12/2001 Shur .......................... 713/176

FOREIGN PATENT DOCUMENTS

| EP | 0942417 A2 | 9/1999 |
| WO | WO9918723 | 4/1999 |
| WO | WO9945707 | 9/1999 |
| WO | WO0013414 | 3/2000 |

* cited by examiner

*Primary Examiner*—Thomas R. Peeso

(57) ABSTRACT

Method of and system for detecting a watermark in MPEG-2 encoded video data during high-speed copying of the video data. A bus spy (120) selects independently coded frames, such as I-frames, from the video data and feeds the selected frames to a watermark detector (130) for detecting a watermark therein. By only supplying some of the frames to the watermark detector (130), the average input data rate for the watermark detector (130) is much lower than the data rate during the high-speed copying. Various embodiments present various ways to efficiently supply the contents of the selected frames to the watermark detector (130).

16 Claims, 2 Drawing Sheets

METHOD AND DEVICE FOR DETECTING A WATERMARK

Figure 1:
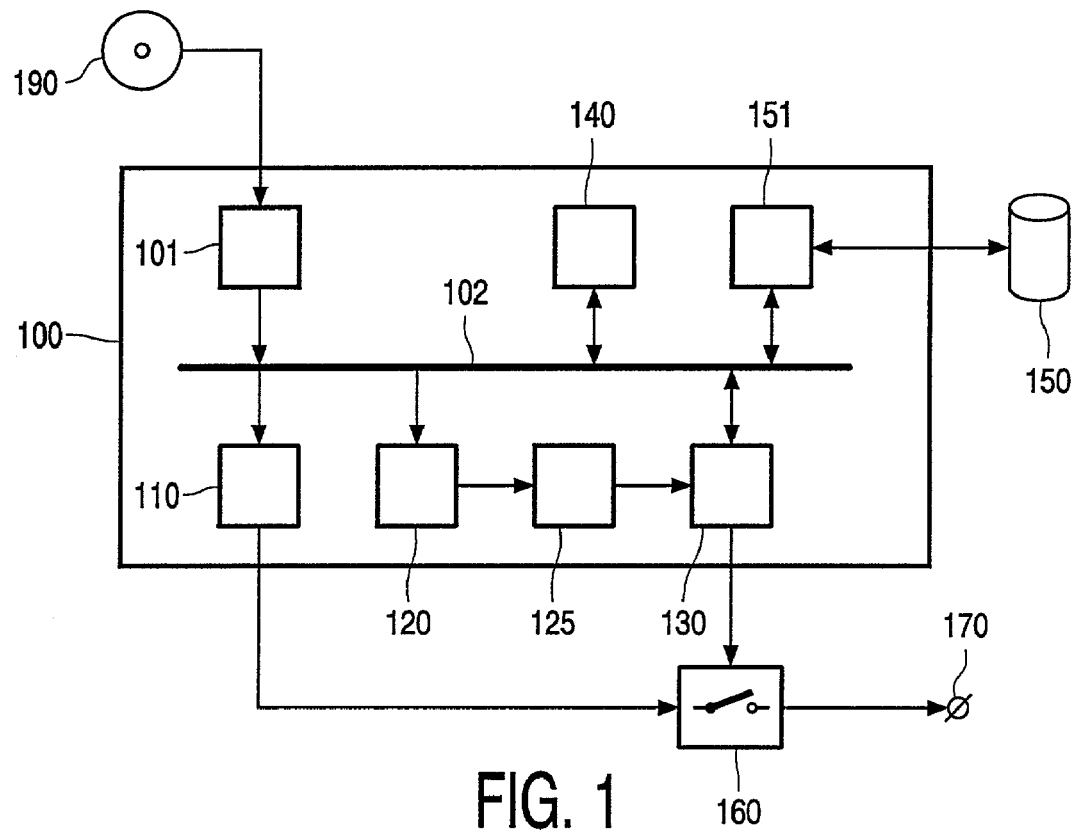

The invention relates to a method of detecting a watermark in a data stream comprising frames. The invention further relates to a device for detecting a watermark in a data stream comprising frames.

Watermarking, the process of inserting extra information in a data stream such as an audio or video stream, is an important and well-known technique to mark or protect those data streams. A movie can be watermarked so its origin can be identified, or unauthorized copies can be distinguished from the original. Watermarks are also increasingly being used to enforce restrictions on the copying of the data stream. In DVD copy protection, watermarks are used to label material as "copy once", "never copy", "copy no more" or "no restriction". When a data stream is copied from a DVD disc, the device performing the copying must check for the presence of a watermark. If one is found, and the watermark indicates that the data stream may not be copied (any further), then the device must refuse to make a copy of the data stream.

When the data stream is a video stream, the amount of data to be processed is huge. Typically, a video stream will be compressed using a scheme such as ISO/IEC 11172 MPEG-1 or ISO/IEC 13818 MPEG-2 compression. In future, also the ISO/IEC 14496 MPEG-4 scheme may be used. This achieves a substantial reduction in the size of the video stream. However, it also means a substantial increase in the processing power required for the detection of a watermark in a video stream. The detection of a watermark requires the decompression of the frames of the video stream, and the processing of the decompressed frames to detect any watermark.

Although processing an MPEG-2 compressed video stream is feasible when the video stream is being copied in real time, during high speed copying the required processing speed becomes impossibly large. For example, a typical video stream comprises 25 or 30 frames per second. When copying this video stream at a high speed of 20 times the normal speed, that means 500 or 600 frames per second are to be processed to detect a watermark. This is a bitstream of about 300–400 Mbit per second, with peaks of up to 800 Mbit per second. In contrast, current hardware-based watermark detectors operating on MPEG bitstreams cannot reliably detect a watermark in a bitstream of more than 100 Mbit per second. At the same time, it is not acceptable to delay the detection of a watermark when watermarks are used for enforcing copy restrictions. The longer the time between starting the copying process and detecting a watermark that indicates that copying is not permitted, the more material a pirate can illegally copy.

It is an object of the invention to provide a method according to the preamble, which can operate quickly during a high speed copying process.

This object is achieved according to the invention in a method comprising selecting an independently coded frame from the data stream, and supplying identifying data for the selected frame to a watermark detector for detecting a watermark therein. The data to be copied from a DVD or other source will contain a mixture of audio streams, video streams and other information. It suffices to detect a watermark in only one of these streams. Further, not all frames of the selected data stream are necessary to detect a watermark in the selected data stream. Some frames contain more watermark information than others. In particular, independently coded frames typically contain more watermark information than dependently coded frames. By selecting only the independently coded frames, the watermark detector is provided with data at a much lower rate than the copying process. Still, these frames provide the watermark detector with sufficient information to facilitate reliable watermark detection.

In an embodiment the method further comprises buffering the frame in a buffer memory, determining an address location in the buffer memory of the frame, and supplying the address location to the watermark detector. Often, the copying process involves temporarily storing (parts of) the data stream in a buffer memory. The size of this buffer memory is normally relatively high, so the frames stored therein will stay there for a relatively long time before they are overwritten by new data. The stored frames remain in the buffer memory after they have been read out. Since the watermark detector needs the contents of the selected frames, it is advantageous to determine an address location in the buffer memory of these frames.

In a further embodiment the method further comprises copying at least a content portion of the frame into a local memory and supplying the contents of the local memory to the watermark detector. By storing (content portions of) selected frames in a local memory, the watermark detector can simply access the local memory, retrieve the stored frame data and detect the watermark therein.

In a further embodiment the data stream comprises a Video Elementary Stream formatted in accordance with the ISO/IEC 13818 MPEG-2 format, and the selected frame comprises an I-frame of the Video Elementary Stream. In a typical MPEG-2 video stream, usually about one in every ten to twelve frames is an I-frame. So, by selecting only the I-frames of the video portion of the data stream, a substantial reduction in the size of the data stream fed to the watermark detector is achieved.

In a further embodiment the method further comprises processing the selected frame to obtain at least one DCT coefficient, and supplying the at least one DCT coefficient to the watermark detector. Watermark detectors do not always require all the data from the selected frames to detect a watermark. In particular, the watermarking detection system as disclosed in WO 99/45707 (Attorney Docket PHN 17315) by the same applicant as the present application can detect a watermark in a video stream using only DCT coefficients from individual frames.

It is a further object of the invention to provide a device according to the preamble, which can quickly detect a watermark during high speed copying.

This object is achieved according to the invention in a device comprising frames, the device comprising selection means for selecting an independently coded frame from the data stream, and processing means for supplying identifying data for the selected frame to a watermark detector for detecting a watermark therein.

Advantageous embodiments of the device are laid out in claims 7–9.

The invention further relates to a computer program product arranged for causing a processor to execute the method according to the invention.

Figure 3:
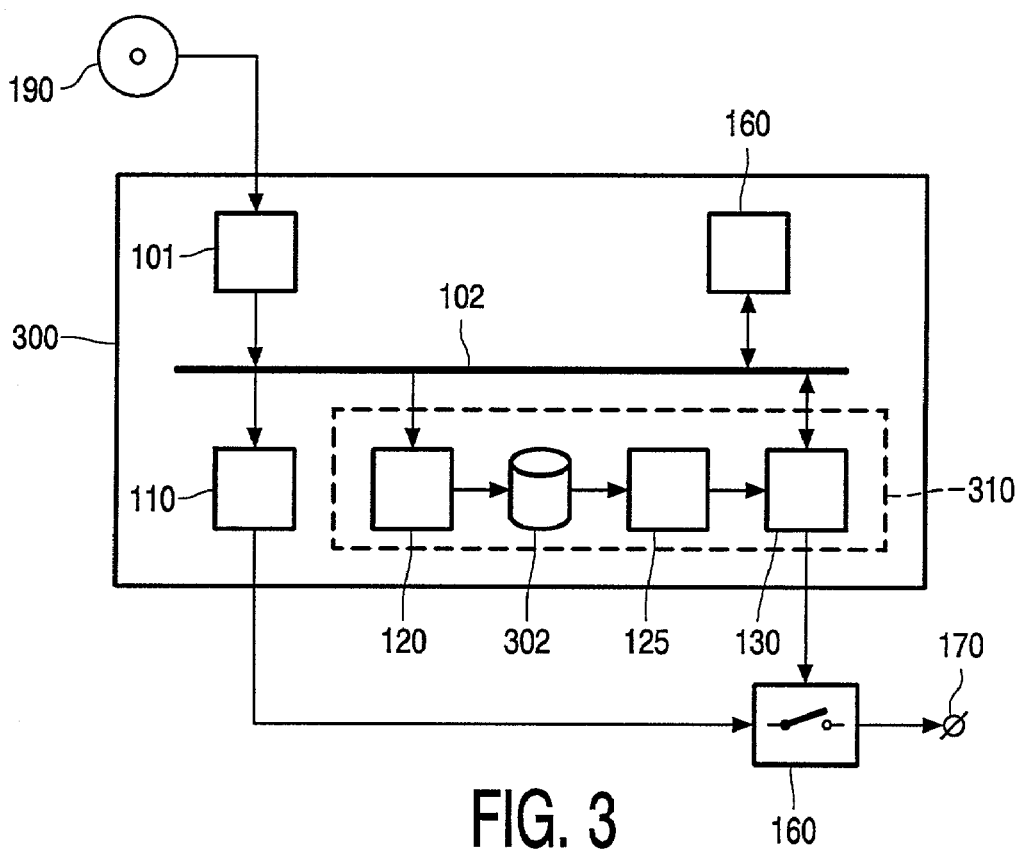
Figure 2:
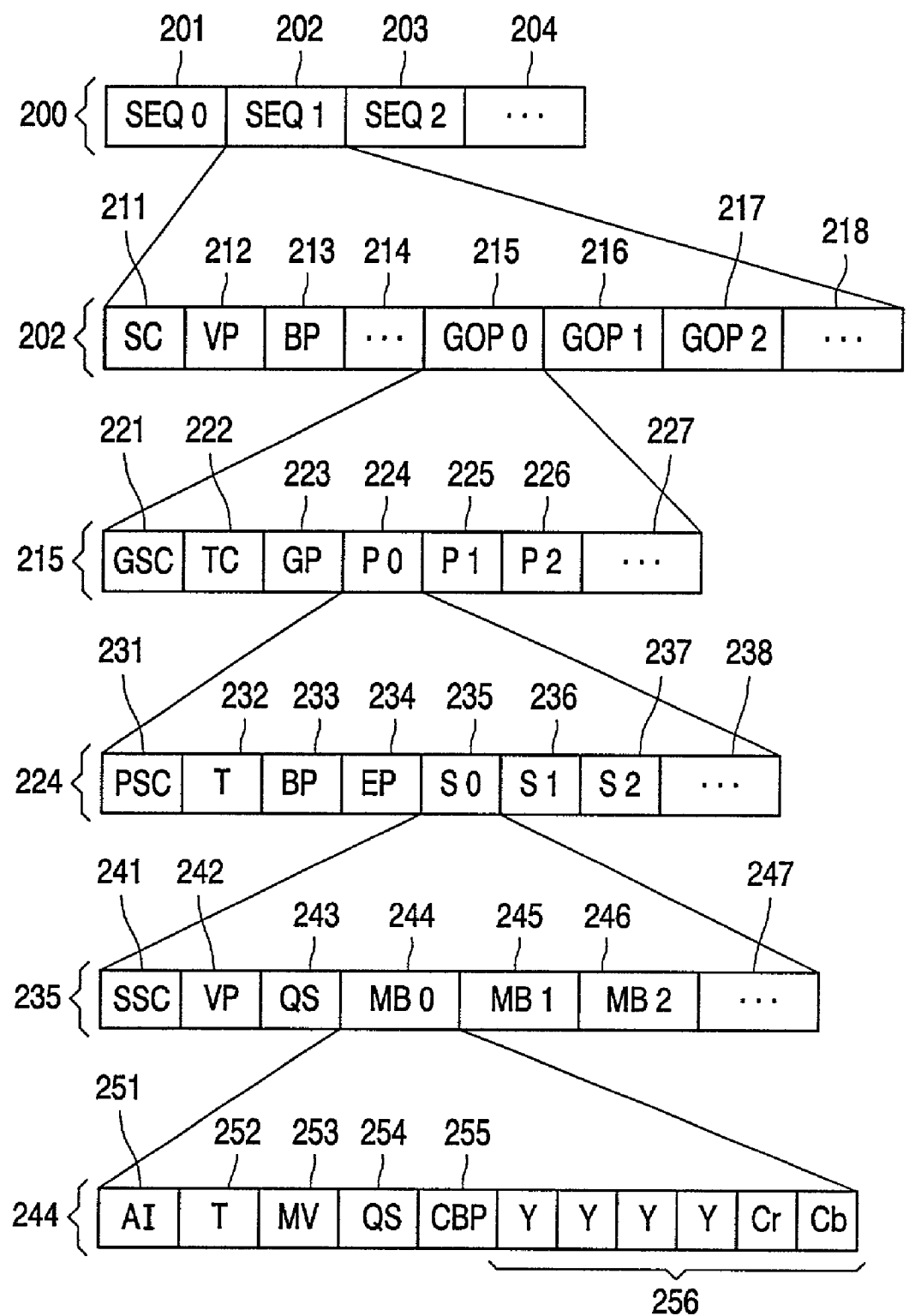

These and other aspect of the invention will be apparent from and elucidated with reference to the embodiments shown in the drawings, in which:

FIG. 1 schematically shows a first embodiment of the device according to the invention;

FIG. 2 schematically shows the structure of a data stream formatted in accordance with the MPEG-2 standard; and FIG. 3 schematically shows a second embodiment of the device according to the invention.

Throughout the Fig.s, same reference numerals indicate similar or corresponding features. Some of the features indicated in the drawings are typically implemented in software, and as such represent software entities such as software modules and objects.

FIG. 1 schematically shows a first embodiment of a device 100 arranged for detecting a watermark in a data stream. The device 100 is for instance a processing IC which is used in a DVD drive, but may also be a computer program running on a general purpose computer system. An input processor 101, for example a DVD player, reads a data stream from a DVD 190. Of course the invention is not restricted to data streams read from a DVD. Other data sources can also be used. The data stream is preferably formatted in accordance with the ISO/IEC 13818 MPEG-2 format.

The input processor 101 is connected to a bus 102, to which it feeds the data stream. An output processor 110 reads the data stream from the bus 102 and outputs the data stream to an output terminal 170. The output terminal 170 can be connected to an external MPEG decoding and display device (not shown). The output terminal 170 can also be connected to a hard disk or a DVD-read/write unit, so that a copy of the data stream can be made thereon The operations that can be performed by the device 100 depend in part on what the output terminal 170 is coupled to.

It is assumed that the data stream as read from the DVD 190 comprises a watermark indicating restrictions on copying and/or playback of the data stream. The device 100 is provided with a watermark detector 130, which is also connected to the bus 102. The watermark detector 130 reads the data stream as it passes over the bus 102, and determines whether a watermark is present in the data stream.

When the watermark detector 130 detects a watermark in the data stream, and this watermark prohibits the operation currently in progress, the watermark detector 130 operates a switch 160 to prohibit output to the output terminal 170. For example, if the data stream is being copied, and the watermark indicates a "copy never" restriction, then the watermark detector 130 will open the switch 160 to prevent the data from being output to the output terminal 170. If no watermark was found, or the watermark found does not prohibit the operation in progress, the switch 160 is closed and the output is passed on to the output terminal 170.

In an alternative embodiment, the watermark detector 130 simply sends a signal to a controlling module (not shown) to indicate that a watermark was found. The controlling module can then take appropriate action. For example, the controlling module may warn the user that the operation is not permitted, or temporarily suspends the operation to ask the user to make a payment before proceeding.

The watermark detector 130 is coupled to a processing module 125, which can decode and process frames from the data stream before they are supplied to the watermark detector 130. The processing module 125 may for instance comprise an MPEG decoder which converts frames from an MPEG-encoded data stream into raw image data suitable for processing by the watermark detector 130.

In a preferred embodiment, the watermark detector 130 operates as disclosed in WO 99/45707 (Attorney Docket PHN 17.315) by the same applicant as the present application. In this embodiment, the processing module 125 processes the selected frame to obtain at least one DCT coefficient, and supplies the at least one DCT coefficient to the watermark detector 130. Watermark detectors do not always require all the data from the selected frames to detect a watermark. In particular, the watermarking detection system as disclosed in WO 99/45707 can detect a watermark in a video stream using only DCT coefficients from individual frames.

When the data stream is being copied, it is often temporarily stored in a buffer memory 150 before outputting to the output terminal 170. A memory controller 151 is connected to the bus 102 to control the buffering process. The buffer memory 150, external to the device 100, can be for instance a 16 megabit SDRAM. The input processor 101 writes the data stream to the bus 102, where the memory controller 151 can read it and store it in the buffer memory 150. The output processor 110 requests portions of the data stream as stored in the buffer memory 150 and outputs then towards the output terminal 170. By using buffering, variations in the input data rate can be eliminated, so that the output processor 110 can output the data stream at a substantially constant speed.

The memory controller 151 uses a read pointer and a write pointer to manage the information in the buffer memory 150. Frames are written to the buffer memory 150 at the address location pointed to by the write pointer, after which the write pointer is moved ahead to the next available address location. Frames are similarly read out from the buffer memory 150 at the address location pointed to by the read pointer, after which the read pointer is moved ahead to the address location of the next buffered frame.

Other processing, such as error correction, may also be performed on the data stream as it is being read from the DVD 190 e.g. by error correcting module 140.

When making a copy of the DVD 190, it is desirable that the copy is made at a high speed, such as 20 or 25 times the normal playback speed. This means that the device 100 will have to process a large amount of data per second. For example, a video stream formatted in accordance with the PAL standard comprises 25 frames per second. At 20 times the normal speed, that means 500 frames per second. However, no watermark detector will be able to process 500 MPEG-encoded frames per second to detect a watermark therein.

To obtain a lower average data rate for the watermark detector 130, a bus spy 120 is connected to the bus 102. The bus spy 120 observes the data stream as it passes over the bus, e.g. from the input processor 101 to the memory controller 151. The bus spy 120 performs simple processing such that independently coded frames in the data stream are identified. In a preferred embodiment, the bus spy 120 identifies the I-frames from the MPEG-2 formatted data stream. Having identified such a frame, the bus spy 120 needs to supply the contents of the selected frame to the processing module 125 for further processing, and then to the watermark detector 130 for use in the watermark detection process.

As the selected frame is already being stored in the buffer memory 150 as part of the buffering process, it makes sense to use the buffer memory 150 as an input for the watermark detector 130. Frames are written to the buffer memory 150 in a cyclic manner. Initially, the write pointer points to the first memory location in the buffer memory 150, and so the first frame will be written to the first memory location in the buffer memory 150. The write pointer is then moved to the second location, and then the second frame is written to to the second location, and so on.

Once a frame has been written to the last memory location in the buffer memory 150, the write pointer moves back to the first memory location and then the next frame will be written to the first memory location. However, as normally the size of the buffer memory 150 is relatively high with respect to the size of a frame, frames will stay in the buffer memory 150 for a long time before they are being overwritten by new frames. Also, they are not being erased after having being read out.

So, when a frame has been identified as being an independently coded frame, the bus spy 120 now determines an address location in the buffer memory 150 of that frame. The processing module 125 can then directly access the selected frame from the buffer memory 150.

Optionally, the bus spy 120 examines a header portion of the frame to determine the starting point of the content portion of the frame. Typically, the header of the frame will have a variable size, so the header needs to be examined to determine where the content portion starts. The watermark detector 130 only needs the data from the content portion, so it makes sense to remember only this position. The bus spy 120 can then determine an address location in the buffer memory 150 of the content portion. This address location can then be provided to the watermark detector 130. The watermark detector 130 can then directly read the content portion of the selected frame from the buffer memory 150, and process it to determine if watermark data is present in the selected frame. However, this only works if the processing module 125 can extract the necessary information without having access to the header portion of the frame. This in turn depends on what information the watermark detector 130 needs from individual frames.

It may happen that, by the time the watermark detector 130 accesses the address location as supplied, the frame in question has been overwritten by new data. In general, the new data at that address location will not be the start of a new frame, let alone an independently coded frame. If the processing module 125 nor the watermark detector 130 guard against this situation, then decoding of the new data will fail. The processing module 125 may go out of sync and have to restart the decoding process from scratch, which takes time.

So, in a preferred embodiment the bus spy 120 not only records the address location of an independently coded frame, but also the time at which this address location was recorded. The processing module 125 can then determine the current time, the current location of the write pointer in the buffer memory 150 and derive from that whether the address location is still valid. If the processing module 125 determines that the address location has been overwritten by new data, it skips that address location and proceeds with the next one.

Since frames are coming in at a high rate, also independently coded frames will come in at a high rate, so on the average it takes little time before the processing module 125 gets in sync again.

By reusing the contents of the buffer memory 150, the memory demands of the device 100 are reduced. Also, the device 100 has the lowest possible additional memory requirements to do the additional processing. By operating in this way, the device 100 uses a minimal overhead time to search for video elementary stream data in a data stream.

FIG. 2 schematically shows the structure of a data stream 200 formatted in accordance with the MPEG-2 standard. This structure will now be discussed briefly to explain those elements thereof that are relevant to the present invention. Details on the exact structure and the meaning of the elements thereof can be found in the MPEG-2 specification, ISO/IEC 13818.

The data stream 200 comprises sequences 201, 202, 203, 204. Each of the sequences 201–204 can be a video sequence, an audio sequence or a sequence containing other information. Such sequences are also called streams.

Assume that the sequence 202 is a video sequence or video elementary stream (VES). A video sequence begins with a sequence header, comprising a start code 211, video parameters 212, bitstream parameters 213 and other header information 214. The header is followed by one or more groups of pictures (GOP) 215–218.

A group of pictures (GOP) 215 in turn comprises a header, and a number of pictures. The header comprises a GOP start code 221, a time code 222, and GOP parameters 223. This is followed by the actual pictures 224–227. In the context of MPEG-2, these pictures are also referred to as "frames". A frame in an MPEG-2 video stream can be one of three types. The type of a frame defines which prediction modes may be used to code the blocks in the frame.

I-frames (Intra-frames) are coded without reference to other frames. Moderate compression is achieved by reducing spatial redundancy, but not temporal redundancy. I-frames are used periodically to provide access points in the data stream where decoding can begin.

P-frames (Predictive frames) are coded with reference to previous I- or P-frames. The blocks in a P-frame can either be predicted or intra-coded. By reducing spatial and temporal redundancy, P-frames offer increased compression compared to I-frames.

B-frames (bidirectionally predictive frames) are coded with reference to previous and next I- or P-frames. The blocks in a B-frame can be forward, backward or bidirectionally predicted or intra-coded. B-frames offer the highest degree of compression. To enable backward prediction from future frames, the MPEG coder reorders the frames from the normal "display" order to "bit stream" order so that the B-frame is transmitted after the previous and next P- and I-frames. This introduces a reordering delay dependent on the number of consecutive B-frames.

A typical GOP in display order is:

$B_1 \ B_2 \ I_3 \ B_4 \ B_5 \ P_6 \ B_7 \ B_8 \ P_9 \ B_{10} \ B_{11} \ P_{12} \ B_{13} \ B_{14} \ I_{15}$

The corresponding bitstream order is:

$I_3 \ B_1 \ B_2 \ P_6 \ B_4 \ B_5 \ P_9 \ B_7 \ B_8 \ P_{12} \ B_{10} \ B_{11} \ I_{15} \ B_{13} \ B_{14}$

A regular GOP structure can be described with two parameters: N, which is the number of pictures in the GOP, and M, which is the spacing of P-frames. The GOP given here is described as N=12 and M=3. It will be appreciated that, instead of processing all the frames from a GOP to check for the presence of a watermark, processing only the I-frames provides a reduction at a factor of 12 in the amount of frames to be processed.

A frame 224 in turn comprises a header with picture start code 231, type indicator 232, buffer parameters 233, encoding parameters 234, followed by a number of slices 235–238. Slices contain information on a part of the frame. A slice 235 comprises a slice start code 241, a vertical position indicator 242, a quality scale 243, followed by a set of macro blocks 244–247.

A macro block 244 is the basic coding unit in the MPEG-2 algorithm. It is a 16×16 pixel segment in a slice. The order of the macro blocks within a slice is from left to right, and from top to bottom. The macro block 244 contains an address indicator 251, a type 252, a motion vector 253, a quality scale 254, a coded block pattern 255 and six blocks 256.

A picture or frame in MPEG-2 consists of three rectangular matrices representing luminance (Y) and two chrominance (Cb and Cr) values. The Y matrix has an even number of rows and columns, the Cb and Cr matrices are one-half the size of the Y matrix in each direction. Since each chrominance component has one-half the vertical and horizontal resolution of the luminance component, a macro block consists of four Y, one Cr and one Cb block, giving a total of six blocks.

FIG. 3 shows a second embodiment of a device 300 according to the invention. Although the device 300 is similar to the device 100 of FIG. 1, the device 300 is not connected to a buffer memory 150. Still, it is desirable that the device 300 is able to detect a watermark in a data stream from the DVD 190 as it is being copied at high speed.

The bus spy 120 now still inspects the frames as they pass over the bus 102, and examines the header portions of the frames to determine whether they are independently coded frames. In the case of MPEG-2, the bus spy 120 examines the header portion of the frame to determine whether the frame is an I-frame.

If it turns out that this is the case, the bus spy 120 copies the selected frame to a local memory 302. This local memory 302 is preferably a 32 kB SDRAM. The processing module 125 can then read the contents of the local memory 302 and supply the contents to the watermark detector 130, e.g. via the bus 102. As explained above, the processing module 125 may first process the frames stored in the local memory 302 to obtain at least one DCT coefficient, and supply the at least one DCT coefficient to the watermark detector 130.

Preferably, instead of storing the whole frame, the bus spy 120 copies only a content portion of the frame into the local memory 302. This way the amount of data stored in the local memory 302 is smaller per frame.

It may not even be necessary to store the whole content of the I-frame in the local memory 302. A number of slices from the I-frame can be sufficient. When watermarking a data stream, watermark data is often repeated in various portions of a frame, so that the watermark detector 130 can even operate on only a partial frame. So, the bus spy 120 may only need to store one or more slices from the I-frame. It can theoretically happen that a slice is larger than the size of the local memory 302. In such a case, only the first 32 kB of a slice is to be stored in the local memory 302. This should be sufficient to detect a watermark.

When multiple I-frames are stored, it may be advantageous to store different slices from different I-frames. For example, the first slice of the first I-frame is stored, the second slice of the second I-frame, and so on. Alternatively, all the slices of the first I-frame are stored, the second and further slices of the second I-frame are stored, the third and further slices of the third I-frame are being stored, and so on. This way, the watermark detector 130 is provided with a representative sample of the data stream, since the difference slices will represent different portions of the scene being depicted in the video stream. If from all the I-frames only the first slice were to be stored, it may happen that these slices all represent relatively continuous areas carrying insufficient information to reliably detect a watermark.

In this embodiment of the device 300, the bus spy 120, the local memory 302, the processing module 125 and the watermark detector 130, only interact with the rest of the device 100 by reading data from the bus 102 and writing data to it. This makes it possible to embody the bus spy unit 120, the local memory 302, the processing module 125 and the watermark detector 130 as a separate component 310, such as an integrated circuit. This component 310 can then be manufactured separately and added to any device in which it is desirable to be able to reliably detect a watermark during high speed copying.

The component 310 can alternatively be constructed without the watermark detector 130, so that the component 310 and the watermark detector 130 can be sold as two separate units. The device 300 may already comprise a watermark detector. By adding a component comprising the bus spy 120, the local memory 302 and the processing module 125, the device 300 can then reliably detect watermarks at high speed. Component 310 then communicates with the watermark detector 130 via the bus 102 or via a separate connection.

Instead of supplying the selected frames to the watermark detector 130, the selected frames could conceivably also be supplied to another module which requires only a part of the data stream. The method according to the invention can thus be in general used in any high speed system where only a part of the data needs to be processed on a lower speed. For example, the invention can be applied to create a so-called trick play stream for a video stream. Such a stream is representative of the original video stream, but has a much lower number of frames. It is created by selecting e.g. the I-frames from an MPEG-2 video stream, and processing them to obtain a new video stream. When this new video stream is played back, the view gets the impression that he is watching the original video stream at a higher playback speed, typically associated with fast forward or fast backward playback. As outlined above, the bus spy 120 can be used to identify the I-frames, and the processing module 125 can feed those frames to a trick play generator 160.

The invention claimed is:

1. A method for detecting a watermark in a data stream comprising frames, comprising:
   determining which, if any, of said frames is independently coded; and
   selecting, for supply to a watermark detector for detecting a watermark, identifying data of a frame for which an outcome of said determining is that the frame is an independently coded frame.

2. The method as claimed in claim 1, further comprising:
   buffering said frame in a buffer memory, wherein said selecting comprises determining an address location in the buffer memory of said frame; and
   supplying the address location to the watermark detector.

3. The method as claimed in claim 1, further comprising copying at least a content portion of said frame into a local memory and supplying contents of the local memory to the watermark detector.

4. A computer program product comprising a computer readable medium into which is embodied a computer program for causing a processor to execute the method as claimed in claim 1.

5. The method of claim 1, wherein said frame comprises image data, said image data being intra-coded.

6. The method of claim 1, further comprising supplying said identifying data to said watermark detector.

7. The method of claim 6, further comprising bypassing said supplying for a frame that said determining determines to be independently coded.

8. A method of detecting a watermark in a data stream comprising frames, comprising selecting an independently coded frame from the data stream, and supplying identifying data for the selected frame to a watermark detector for detecting a watermark therein, whereby the data stream comprises a Video Elementary Stream formatted in accordance with the ISO/IEC 13818 MPEG-2 format, and the selected frame comprises an I-frame of the Video Elementary Stream.

9. The method as claimed in claim 8, further comprising processing the selected frame to obtain at least one DCT coefficient, and supplying the at least one DCT coefficient to the watermark detector.

10. A device for detecting a watermark in a data stream comprising frames, the device comprising:
means for determining which, if any, of said frames is independently coded; and
means for selecting, for supply to a watermark detector for detecting a watermark, identifying data of a frame that said means for determining determines to be an independently coded frame.

11. The device as claimed in claim 10, further comprising:
buffering means for buffering said frame in a buffer memory, said means for selecting being configured for determining an address location in the buffer memory of said frame; and
processing means configured for the supplying to the watermark detector of the selected identifying data, said data comprising said address location.

12. The device as claimed in claim 10, said means for selecting being configured for copying at least a content portion of said frame into a local memory, said device further comprising processing means configured for supplying contents of the local memory to the watermark detector.

13. The device of claim 10, further comprising processing means configured for the supplying of said identifying data to said watermark detector.

14. The device of claim 13, further configured for bypassing said supplying for a frame that said determining determines to be independently coded.

15. The device of claim 6, wherein said frame comprises image data, said image data being intra-coded.

16. A device for detecting a watermark in a data stream comprising frames, the device comprising selection means for selecting an independently coded frame from the data stream, and processing means for supplying identifying data for the selected frame to a watermark detector for detecting a watermark therein, the processing means being arranged for processing the selected frame to obtain at least one DCT coefficient, and for supplying the at least one DCT coefficient to the watermark detector.

* * * * *